US005284510A

United States Patent [19]

Levy

[11] Patent Number: 5,284,510

[45] Date of Patent: Feb. 8, 1994

[54] ORGANIC SOLVENT BASED LIQUID COMPOSITION FOR ENHANCING ADHERENCE OF COATINGS TO SUBSTRATES

[75] Inventor: Maurice Levy, Garges les Gonesse, France

[73] Assignee: Paris Laque Service, Aubervilliers, France

[21] Appl. No.: 523,810

[22] Filed: May 16, 1990

[30] Foreign Application Priority Data

May 16, 1989 [FR] France ............................... 89 06366

[51] Int. Cl.$^5$ ............................................ C09D 183/12

[52] U.S. Cl. ................................ 106/287.14; 106/285

[58] Field of Search ............................ 106/285, 287.14

[56] References Cited

U.S. PATENT DOCUMENTS

| | | | |
|---|---|---|---|
| 3,994,751 | 11/1976 | Ingram | 252/171 |
| 4,247,580 | 1/1981 | Chao | 427/140 |
| 4,336,024 | 6/1982 | Denissenko et al. | 8/142 |
| 4,465,715 | 8/1984 | Manabe et al. | 427/444 |
| 4,772,407 | 9/1988 | Carlson | 252/74 |

OTHER PUBLICATIONS

Schwartz et al, *Surface Active Agents and Detergents*, vol. II, Interscience, 1958, p. 148.

Hawley, ed., *Condensed Chemical Dictionary*, Van Nostrand Reinhold, NY, 1974, p. 784.

*Primary Examiner*—David Brunsman

*Attorney, Agent, or Firm*—Hoffman, Wasson & Gitler

[57] ABSTRACT

Liquid composition based on organic solvents to facilitate the adherence of coatings to substrates.

A composition having the following ingredients provides excellent adherence characteristics to coatings applied to various substrates pretreated with the composition. The composition contains a mixture of organic solvents as follows:

from 17 to 35% of xylenes,
from 4 to 14% of ethylbenzene,
from 55 to 75% of white spirit, and optionally
from 0.05 to 3% of an methylpolysiloxane modified by a polyether oil.

The composition may be used on substrates like steel, iron, copper, brass, chrome, tin, aluminum, glass, earthenware, rubber, plastic and polyesters. It leads to improved adherence to such substrates of coatings like paint, varnish, glue and mastic as well as coatings applied by chrome-plating, galvanization and gold and silver plating.

3 Claims, No Drawings

ORGANIC SOLVENT BASED LIQUID COMPOSITION FOR ENHANCING ADHERENCE OF COATINGS TO SUBSTRATES

BACKGROUND OF THE INVENTION

1. Field of the Invention

This invention relates to a liquid composition based on organic solvents. The composition applied in advance to the chosen substrate provides excellent adherence of coatings to all types of rigid or semi-rigid substrate.

2. Background of the Invention

Prior techniques for enhancing the adherence of various coatings, particularly paints and varnishes, to substrates such as ferrous or non-ferrous metals involve preparing substrate surfaces so as to remove imperfections using techniques such as buffing and/or sanding and thereafter (particularly for metal coachwork) by immersing the prepared surface in a cataphoresis bath for protection against corrosion.

It is known that prior fine scratching or microscratching metallic surfaces helps to a greater or lesser degree to retain paints or varnishes applied to such surfaces.

It is also known that where metal has been treated in advance to prevent oxidation phenomena (by known techniques like electrophoresis) it is possible to obtain a generally acceptable degree of adherence.

However, such results are only achieved after numerous preparative steps making these techniques not only long in execution but also rather complex.

OBJECTS OF THE INVENTION

An object of this invention is to provide an excellent measure of adherence of any coating to any kind of rigid or semirigid substrate.

Another object is to achieve such adherence simply and economically using only a mixture of organic solvents of empirically determined type and quantity.

A further object is to use this mixture of organic solvents to rid substrate surfaces completely of all soil such as fatty and greasy materials, dust, silicones and paraffin related products.

Yet another object is the prior treatment of surfaces with the solvent mixture to prevent oxidation phenomena and furthermore to neutralize and pre-existing oxidation by the time the final coating product is applied.

An additional object is the provision of a continuous film of final coating material on a pretreated substrate, the film arising from particles in the coating material positioning themselves on the substrate previously prepared with the above solvent mixture so as to create a sealed layer protecting the substrate from atmospheric oxygen (the principal cause of oxidation).

SUMMARY OF THE INVENTION

The present invention provides a liquid composition allowing, after its prior application to a substrate, excellent adherence of any coating to all types of rigid or semi-rigid substrate, the composition comprising a mixture of organic solvents in the following proportions by weight:

from 17 to 36% of xylenes
from 4 to 14% of ethylbenzene, and
from 55 to 75% of white spirit.

By "xylenes" is meant mixtures of the ortho, meta and para isomers of xylene whose respective proportions in the composition have no effect on its properties.

White spirit is a well known mixture of about 95% aliphatic hydrocarbons and less than 5% aromatic hydrocarbons, these latter being essentially propylbenzene, mesitylene and the xylenes.

DESCRIPTION OF THE PREFERRED EMBODIMENT

The commercial product sold under the name "XYLENE" by LAMBERT-RIVIERE S.A. may be used according to the invention and constitutes about 75±5% by weight of xylenes and about 25±5% by weight of ethylbenzene with less than 1% toluene.

The white spirit sold as "WHITE SPIRIT-5" by LAMBERT-RIVIERE may also be used in the invention.

Both "XYLENE" and "WHITE SPIRIT-5" are characteristically free of benzene.

In a particular preferred embodiment, the composition according to the invention additionally comprises from 0.05 to 3% of an organofunctional silicone oil.

This oil is preferably a methylpolysiloxane modified with a polyether and is characteristically soluble in aliphatic hydrocarbons but not in benzene related hydrocarbons and is substantially soluble in water.

Particularly preferred organofunctional silicone oils in this embodiment are those sold by BAYER as "BAYSILONE OL 17" "BAYSILONE OL 44" and "BAYSILONE OL 31" which are all particularly recommended as spreading agents and as agents for improving surface slipperiness.

Other organofunctional oils of this type may of course also be used without altering in any way the properties of the composition of this embodiment.

A particularly preferred embodiment of this invention comprises a mixture of the following proportions by weight:

from 20 to 30% xylenes,
from 5 to 12% ethylbenzene,
from 60 to 70% white spirit, and optionally
from 0.1 to 1% of an organofunctional silicone oil as defined above.

A variety of studies aiming to evidence the adherence properties of the invention have been carried out on many different substrates particularly rigid or semi-rigid substrates is some cases already bearing a coating.

Such surfaces include steel, iron, copper, brass, chrome, tin, aluminum, glass, earthenware, rubber, plastics, polyesters, certain composites and formica.

The composition of the invention may also of course be applied to surfaces already carrying a coating of some kind (such as for example a coat of paint) with a view to facilitating and adherence of a second coat.

It is however to be noted that the invention is in no way limited to the adherence of coats of paint or varnish but may equally be used with other types of coating such as for example layers of glue, mastic or other coatings on joints (e.g. for sealing purposes) when faultless adherence to the surfaces treated is required.

Other coatings useable in conjunction with the present invention include those arising from chrome-plating, galvanization and gold or silver plating.

The technique used for treating surfaces comprises firstly removing large scale soil by washing with water followed by drying.

The composition of the invention is then applied to the surface to be coated either by wetting or spraying or again by application using a cloth. In this last case, the application demands close attention as the cloth must be especially clean and must not leave fibers on the surface being treated.

After a variable drying period ranging from 40 seconds to a few minutes in the open air or for about 15 seconds in a drying shed, the desired final coating may be applied.

It is important to ensure that the surface treated with the composition does not come into contact with the fingers otherwise the final coating will lack adherence where the fingers touched.

It has also been discovered that, rather surprisingly, when the liquid composition of the invention is present in the coating product itself (in an amount depending on the nature of the coating product and on the solubility of the composition therein) it is again possible to improve the adherence of the coating to the substrate.

Thus, for example, the addition of 1 to 20% of the composition according to the invention to paints of which white spirit is ordinarily a diluent, very significantly improves the adherence of the paint to its substrate. Tests carried out in an atmosphere of saline humidity have shown such modified paints to have good adherence properties.

The composition according to the invention therefore constitutes an additive of choice for effecting improved adhesion of various coatings and in particular of certain paints.

The composition according to the invention also has an application in another field where excellent adherence is required, namely in cosmetics, more particularly for nail varnish.

The present invention therefore relates additionally to such a composition as described above for application to finger nails prior to the application of colored, uncolored or clear nail varnish.

Using such prior treatment, it has been observed that ordinary nail varnish can demonstrate an impressive measure of adherence to the nails.

There follows, for the purposes of illustration and not for limitation of this invention's scope, several examples demonstrating the improved adherence properties exhibited by various coatings when the composition of the present invention is used.

EXAMPLE 1 (a)

An adhesive chestnut-colored commercial tape (normally used for wrapping) having a width of 50 mm was placed on a plate of plexiglass previously immersed for a few seconds in a bath containing the following liquid composition:

| | |
|---|---|
| xylenes | 30% |
| ethylbenzene | 8% |
| "BAYSILONE OL 17" (Bayer) | 0.4% |
| white spirit q.s.p. | 100% |

The Plexiglass® was dried for several minutes at ambient temperature before applying the tape.

After 20 minutes at 60° C. the adhesive tape was removed.

Quite unexpectedly, the glue on the tape had transferred to the Plexiglass®, the original plastic band forming the tape being totally free of glue.

The plate (of Plexiglass®) after removal of the tape thus bore a 50 mm wide chestnut colored strip corresponding to the color of the glue on the tape.

The glue fixed to the plate of plexiglass exhibited all its original fixative properties. The adherence of the glue to the plate of plexiglass after pretreatment with the composition according to the invention was thus superior to that of the glue to its initial substrate.

EXAMPLE 1 (b)

A piece of adhesive tape of width 50 mm was applied diagonally to a 500 mm square of plexiglass to define two triangular areas.

One of the triangles was immersed for several seconds in a bath containing the following liquid composition:

| | |
|---|---|
| xylenes | 30% |
| ethylbenzene | 8% |
| "BAYSILONE OL 17" (Bayer) | 0.4% |
| white spirit q.s.p. | 100% |

After several minutes of drying at ambient temperature, a red, two-component polyurethane paint was applied to the pretreated triangle and the other (non-treated) triangle was painted with a yellow, two-component polyurethane paint. The paints were left to dry at 60° C. for 20 minutes.

The plate thus bore a red triangle separated from a yellow triangle by a 50 mm wide diagonal band.

Various paint adherence tests were carried out on the two triangles namely grid scoring, shock resistance and the entire cutting of the plexiglass. These failed to dislodge or even cause flaking of the red paint on the pretreated plexiglass. On the other hand, the same tests carried out on the other triangle painted yellow led to paint loss or splintering indicting poor adherence of the paint to the plexiglass substrate.

EXAMPLE 2

A 200 mm long and 30 mm wide galvanated steel strip was immersed for a few seconds in a bath containing the following liquid composition:

| | |
|---|---|
| "XYLENE" of LAMBERT-RIVIERE S.A. (containing 75 ± 5% xylenes and 25 ± 5% ethylbenzene) | 38% |
| "BAYSILONE OL 17" of Bayer | 0.1% |
| white spirit q.s.p. | 100% |

After several minutes of drying at ambient temperature, a white two-component polyurethane lacquer was applied using a spray gun. After the lacquer had dried, several approximately 20 mm wide vertical cuts were made in the strip using a metal saw.

It was observed that no chipping of the paint occurred. Furthermore grid scoring, bending, cutting, stamping and punching all failed to dislodge or chip the white lacquer applied to the galvanized steel strip.

EXAMPLE 3

A 19 mm wide strip of adhesive tape was bound round the mid point of a 1 m long and 40 mm diameter chrome tube to define the tube's two extremities.

One extremity of the tube was submerged for several seconds in a bath containing the following liquid composition:

| | |
|---|---|
| xylenes | 20% |
| ethylbenzene | 12% |
| white spirit q.s.p. | 100% |

After drying for several minutes at ambient temperature, a matt black acrylic lacquer was applied to the whole of the tube.

After the lacquer was dry the adhesive tape was removed and various lacquer adherence tests were carried out on the pretreated and non-treated parts of the chrome tube.

It was observed that at the position of the ring left by removal of the adhesive tape the edges of the paint on the pretreated end were clean and clearly defined and that the lacquer adhered perfectly to its substrate with no removal being possible through scratching with the finger nails or using a scraper.

On the other hand, for the non-treated portion, the lacquer adhered badly to its substrate and was easily dislodged by simple scraping with the finger nails.

In addition, grid scoring tests and shock resistance tests showed high quality adherence on the pretreated part.

These same tests carried out on the non-treated portion of the chrome tube led to areas of paint loss and flaking often in star patterns.

EXAMPLE 4

A 200 mm×100 mm test piece of sheet metal (ref 552 untreated) was immersed for several seconds in a bath containing the following liquid composition:

| | |
|---|---|
| xylenes | 24% |
| ethylbenzene | 10% |
| "BAYSILONE OL 17" (Bayer) | 0.5% |
| white spirit q.s.p. | 100% |

After a few minutes drying at ambient temperature, the sheet metal was dipped lengthwise into a matt green acrylic paint to a depth of 120 mm. It was again dipped into the same bath but this time to a depth of just 70 mm.

After leaving the sample to drip-dry, varnishing was carried out by immersion in a two-component varnish to a depth of 25 mm. The metal was then dried for 30 minutes at 60° C.

A further layer of the liquid composition according to the invention was then applied to the unpainted portion of the metal sample followed by immersing it to a depth of 70 mm in a green, two component polyurethane paint. The sample was then left to drip-dry before reimmersion in the same paint bath to a depth of 60 mm. The metal sample was then dried at 60° C. for 30 minutes before being submitted to a variety of tests on the various thicknesses of coating on the sheet metal, the tests were as follows:

bending in all directions aiming to shear off a part of the sample; the film notably remained integral to the substrate throughout;

punching at successive 2 mm intervals; no flaking of the paint was noted;

hammering the sheet metal with a rivet hammer, no flaking observed; the paint was cold-drawn with the metal; stamping using a manual stamping press was carried out on the hammered portions and still no flaking was observed.

The examples and trials reported above show that the liquid composition according to the invention maybe applied on diverse substrates to provide for a superior adherence of any kind of subsequent coating.

I claim:

1. A liquid composition to enhance adherence of coatings to rigid or semi-rigid substrates, comprising a mixture of organic solvents in the following proportions by weight:

from 17 to 36% of xylene;
from 4 to 14% of ethylbenzene;
from 55 to 75% of white spirit; and
from 0.05 to 3% of a methylpolysiloxane modified by a polyether.

2. The composition of claim 1 wherein the methylpolysiloxane modified by a polyether is soluble in aliphatic hydrocarbons, insoluble in benzene related hydrocarbons and essentially soluble in water.

3. The composition of claim 1 wherein the mixture of organic solvents is in the following proportions by weight:

from 20 to 30% of xylene;
from 5 to 12% of ethylbenzene;
from 60 to 70% of white spirit; and
from 0.1 to 1% of a methylpolysiloxane modified by a polyether.

* * * * *